United States Patent
Massey et al.

(10) Patent No.: US 11,231,393 B2
(45) Date of Patent: Jan. 25, 2022

(54) ULTRASONIC GAS SENSOR

(71) Applicant: Eaton Intelligent Power Limited, Dublin (IE)

(72) Inventors: Alan Massey, Southampton (GB); Yogesh Shinde, Pune (IN)

(73) Assignee: EATON INTELLIGENT POWER LIMITED, Dublin (IE)

(*) Notice: Subject to any disclaimer, the term of this patent is extended or adjusted under 35 U.S.C. 154(b) by 66 days.

(21) Appl. No.: 16/472,936

(22) PCT Filed: Dec. 20, 2017

(86) PCT No.: PCT/EP2017/083734
§ 371 (c)(1),
(2) Date: Jun. 24, 2019

(87) PCT Pub. No.: WO2018/115077
PCT Pub. Date: Jun. 28, 2018

(65) Prior Publication Data
US 2019/0360968 A1 Nov. 28, 2019

(30) Foreign Application Priority Data
Dec. 23, 2016 (IN) .............. 201611044110

(51) Int. Cl.
*G01N 29/024* (2006.01)
*G01N 29/22* (2006.01)
(Continued)

(52) U.S. Cl.
CPC ......... *G01N 29/024* (2013.01); *G01N 29/222* (2013.01); *G01N 29/2412* (2013.01);
(Continued)

(58) Field of Classification Search
CPC .............. G01N 29/024; G01N 29/222; G01N 29/2412; G01N 29/30; G01N 29/326;
(Continued)

(56) References Cited

U.S. PATENT DOCUMENTS 5,285,677 A * 2/1994 Oehler .................. G01N 27/74
73/24.01
5,581,014 A * 12/1996 Douglas ............... G01N 29/024
331/154
(Continued)

FOREIGN PATENT DOCUMENTS

DE 102014111366 A1 2/2016
EP 0855592 A1 7/1998
(Continued)

*Primary Examiner* — Tarun Sinha
(74) *Attorney, Agent, or Firm* — Merchant & Gould P.C.

(57) ABSTRACT

A gas sensor includes: a main elongate gas chamber with a supply opening arranged on a first end of the main gas chamber and a discharge opening positioned opposite the supply opening and arranged on a second end of the main gas chamber, to permit gas to flow through the main gas chamber; a magnetic field device providing a magnetic field in the main gas chamber; and an ultrasonic transmitter and receiver sensor arranged on either the first or second end of the main elongate gas chamber for directing an ultrasonic wave along a longitudinal axis of the main elongate gas chamber, an opposite end of the main elongate gas chamber being reflective for an ultrasonic wave, or an ultrasonic transmitter sensor arranged on a first end of the main elongate gas chamber and an ultrasonic receiver sensor arranged on a second end of the main elongate gas chamber.

5 Claims, 1 Drawing Sheet

(51) Int. Cl.
   *G01N 29/24*   (2006.01)
   *G01N 29/30*   (2006.01)
   *G01N 29/32*   (2006.01)
   *G01N 29/44*   (2006.01)

(52) U.S. Cl.
   CPC ............ *G01N 29/30* (2013.01); *G01N 29/326* (2013.01); *G01N 29/4436* (2013.01); *G01N 2291/011* (2013.01); *G01N 2291/0212* (2013.01); *G01N 2291/02809* (2013.01); *G01N 2291/101* (2013.01); *G01N 2291/102* (2013.01)

(58) Field of Classification Search
   CPC ......... G01N 29/4436; G01N 2291/011; G01N 2291/0212; G01N 2291/02809; G01N 2291/101
   USPC ....................................................... 73/24.06
   See application file for complete search history.

(56) References Cited

U.S. PATENT DOCUMENTS

| | | |
|---|---|---|
| 6,006,585 A | 12/1999 | Forster |
| 2016/0334371 A1 | 11/2016 | Ganshorn |

FOREIGN PATENT DOCUMENTS

| | | | |
|---|---|---|---|
| JP | 2008256485 A | 10/2008 | |
| WO | 9109306 A1 | 6/1991 | |

\* cited by examiner

ULTRASONIC GAS SENSOR

CROSS-REFERENCE TO PRIOR APPLICATIONS

This application is a U.S. National Phase application under 35 U.S.C. § 371 of International Application No. PCT/EP2017/083734, filed on Dec. 20, 2017, and claims benefit to Indian Patent Application No. IN 201611044110, filed on Dec. 23, 2016. The International Application was published in English on Jun. 28, 2018 as WO 2018/115077 under PCT Article 21(2).

FIELD

The invention relates to a gas sensor, in particular an oxygen sensor.

BACKGROUND

Gas sensors are used in a number of applications, such as in consumer, industrial, automotive and aerospace applications to monitor concentration of various gases. Monitoring of the O2 concentration is a common requirements among wide applications like, healthcare, HVAC systems, Hazardous areas, fuel tank systems etc.

However, oxygen sensors, especially known as lambda sensors require a high gas temperature, typically over 400° C., for the sensor to work. Those temperatures could provide a risk in certain processes and cannot always be obtained.

SUMMARY

In an embodiment, the present invention provides a gas sensor, comprising: a main elongate gas chamber with a supply opening arranged on a first end of the main gas chamber and a discharge opening positioned opposite the supply opening and arranged on a second end of the main gas chamber, so as to permit gas to flow through the main gas chamber; a magnetic field device configured to provide a magnetic field in the main gas chamber; an ultrasonic transmitter and receiver sensor arranged on either the first or second end of the main elongate gas chamber and being configured to direct an ultrasonic wave along a longitudinal axis of the main elongate gas chamber, an opposite end of the main elongate gas chamber being reflective for an ultrasonic wave, or an ultrasonic transmitter sensor arranged on a first end of the main elongate gas chamber and an ultrasonic receiver sensor arranged on a second end of the main elongate gas chamber; and a control unit configured to control the ultrasonic transmitter and receiver sensor and to determine a time of flight of the ultrasonic wave between transmitting and receiving the ultrasonic wave.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
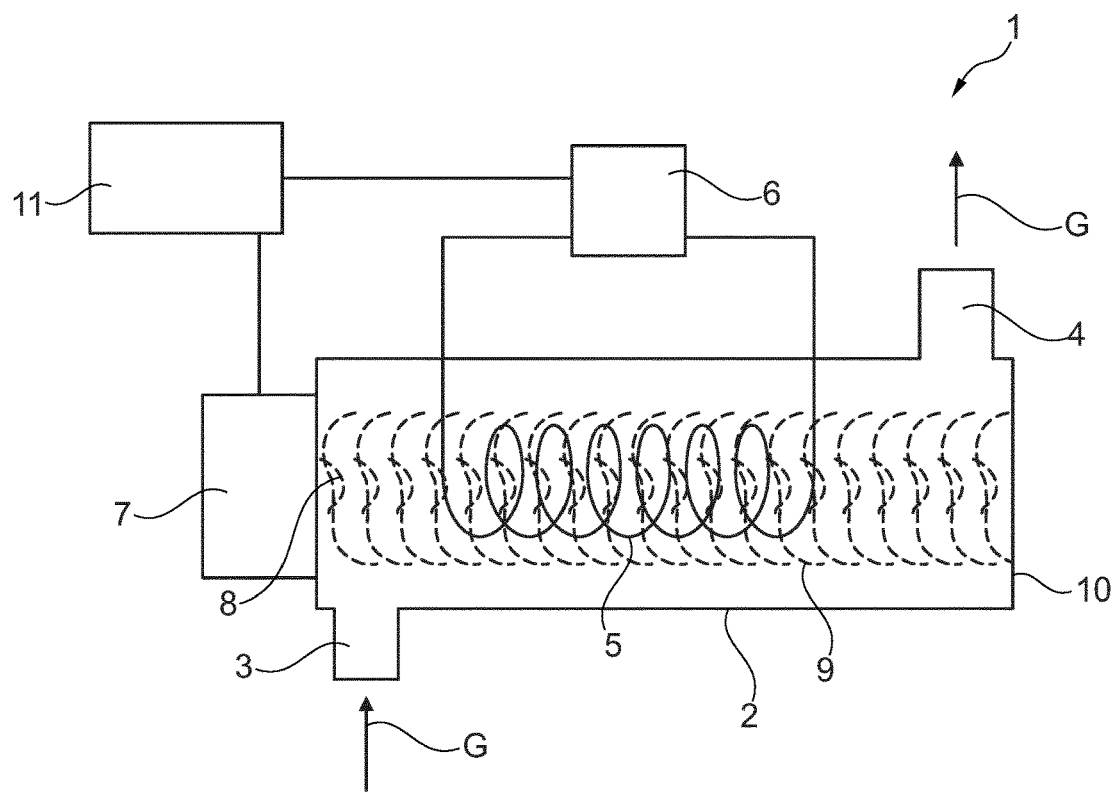
FIG. 1 shows a schematic view of a first embodiment of a gas sensor according to the invention.

In an embodiment, the invention provides a gas sensor, which can function at lower temperatures, especially at room temperature.

In an embodiment, the present invention provides a gas sensor, in particular an oxygen sensor, which gas sensor comprises:

a main elongate gas chamber with a supply opening arranged on a first end of the main gas chamber and a discharge opening positioned opposite of the supply opening and arranged on the second end of the main gas chamber, such that gas can flow through the main gas chamber;

a magnetic field device for providing a magnetic field in the main gas chamber;

an ultrasonic transmitter and receiver sensor arranged on either the first or second end of the main elongate gas chamber to direct an ultrasonic wave along the longitudinal axis of the main elongate gas chamber, wherein the opposite end of the main elongate gas chamber is reflective for the ultrasonic wave or an ultrasonic transmitter sensor arranged on a first end of the main elongate gas chamber and an ultrasonic receiver sensor arranged on a second end of the main elongate gas chamber;

a control unit for controlling the ultrasonic transmitter and receiver sensor and to determine the time of flight of the ultrasonic wave between transmitting and receiving the ultrasonic wave.

With the gas sensor according to the invention it is possible to measure the concentration of the gas, such as oxygen, in the gas chamber at room temperature. This is achieved by subjecting the gas in the gas chamber to a magnetic field, such that the gas will display its paramagnetic properties, in particular obtain an increased density.

By sending an ultrasonic wave through the densified gas, the ultrasonic wave typically will have a shorter time of flight than when the gas is not subjected to a magnetic field and does not have an increased density as a result of the paramagnetic properties of the gas.

So, by having the ultrasonic wave reflected on the opposite wall of the gas chamber, such that the sent ultrasonic wave can also be received, or simply by sending the ultrasonic wave between the separate ultrasonic transmitter and receiver sensors, the control unit can calculate the time of flight and derive the concentration of gas in the gas chamber.

In a preferred embodiment of the gas sensor according to the invention the magnetic field device comprises an electrical coil arranged coaxially with and in the main elongate gas chamber.

With the magnetic coil a strong magnetic field is easily generated and the magnetic field can easily be switched on and off. Preferably the control unit controls the magnetic field device. This allows for a measurement of the time of flight of the ultrasonic wave without the magnetic field as a reference value and for a measurement of the time of flight with the magnetic field. This allows for cancellation of ambient effects such as temperature changes and pressure changes.

A further preferred embodiment of the gas sensor according to the invention comprises a reference elongate gas chamber arranged in parallel fluid connection with the main elongate gas chamber and a second ultrasonic transmitter and receiver sensor arranged on either the first or second end of the reference elongate gas chamber, wherein the opposite end of the reference elongate gas chamber is reflective for the ultrasonic wave or a second ultrasonic transmitter sensor arranged on a first end of the main elongate gas chamber and a second ultrasonic receiver sensor arranged on a second end of the main elongate gas chamber, wherein the reference elongate gas chamber is arranged outside of the magnetic field generated by the magnetic field device and wherein the second ultrasonic transmitter and receiver sensor is controlled by the controller to provide a reference signal.

With this embodiment a separate reference gas chamber is provided, where no magnetic field will be present and the time of flight of the ultrasonic wave can be measured to provide a reference signal, which allows for any effects except for the effect of the magnetic field to be filtered out. As the reference gas chamber is arranged in parallel fluid connection, the reference signal and the actual measurement of the concentration of the gas can be performed continuously.

FIG. 1 shows a first embodiment 1 of a gas sensor according to the invention. The gas sensor 1 has an elongate gas chamber 2 with a supply opening 3 and a discharge opening 4 arranged on the opposite end of the supply opening 3.

An electrical coil 5 is coaxially arranged in the elongate gas chamber 2 and is supplied with alternating current via a power supply 6 in order to generate a magnetic field in the gas chamber 2.

An ultrasonic sensor 7 is arranged on one end of the elongate gas chamber 2. The ultrasonic sensor 7 can send an acoustic wave 8, which travels in longitudinal direction through the gas chamber 2 and reflects on the other end 10 of the gas chamber 2. The reflected ultrasonic wave 9 then travels back and is received by the ultrasonic sensor 7.

A controller 11 controls the ultrasonic sensor 7 and measures the time of flight of the ultrasonic wave 8, 9 in order to obtain a value which corresponds to the concentration of gas G in the gas chamber 2. The controller 11 also controls the power supply 6 in order to turn on and off the magnetic field in the gas chamber 2.

Figure 2:
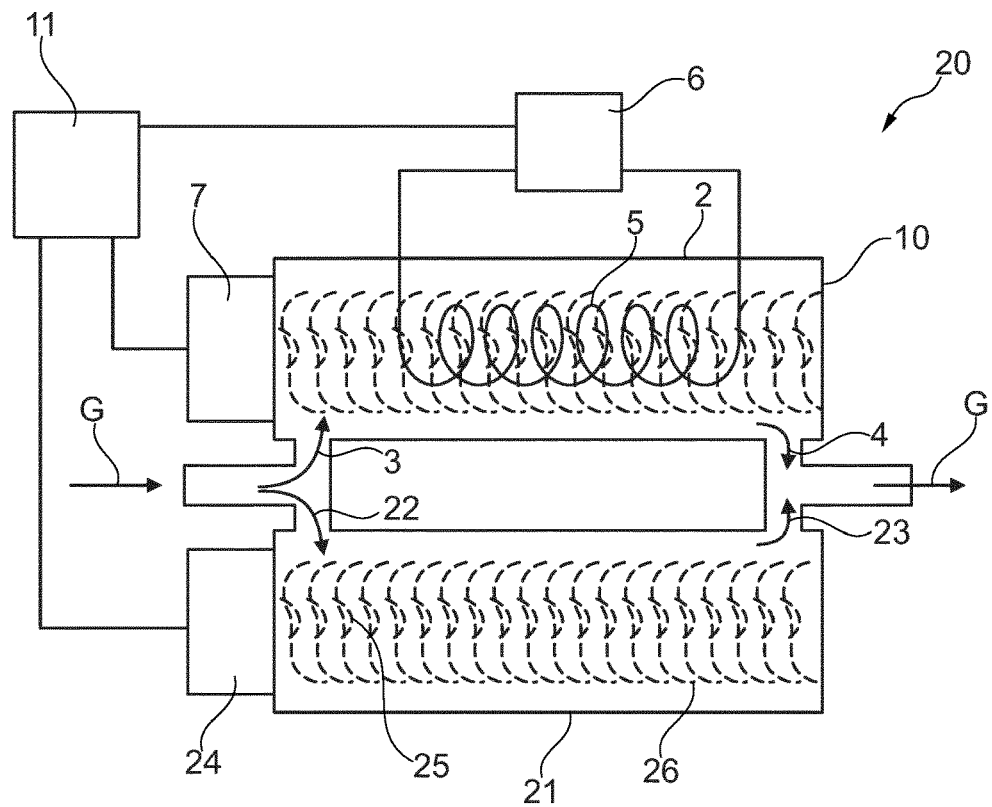
FIG. 2 shows a schematic view of a second embodiment of a gas sensor according to the invention.

FIG. 2 shows a second embodiment 20 of a gas sensor according to the invention. Part of the gas sensor 20 corresponds to the first embodiment 1 and similar parts are provided with the same reference signs.

Compared to the embodiment 1 of FIG. 1, the second embodiment 20 has an additional reference elongate gas chamber 21 with a supply opening 22 and a discharge opening 23, which are arranged in parallel fluid connection with the supply opening 3 and discharge opening 4 of the gas chamber 2.

A second ultrasonic transmitter and receiver sensor 24 is arranged on an end of the reference gas chamber 21, such that an ultrasonic wave 25 can be send into the gas chamber 21 and the reflection 26 thereof can be received by the sensor 24.

The second ultrasonic transmitter and receiver sensor 24 is connected with the controller 11 such that the controller can also measure the time of flight of the ultrasonic wave 25 in the reference gas chamber 21. This allows for a continuous measurement in the elongate gas chamber 2 with the electrical coil 5 producing a magnetic field. The measurements of the sensor 7 can be compared continuously to the measurements of the sensor 24, such that ambient effects, such as temperature and pressure are filtered out.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A gas sensor, comprising:
a main elongate gas chamber with a supply opening arranged on a first end of the main gas chamber and a discharge opening positioned opposite the supply opening and arranged on a second end of the main gas chamber, so as to permit gas to flow through the main gas chamber;
a reference elongate gas chamber arranged in parallel fluid connection with the main elongate gas chamber;
a magnetic field device configured to provide a magnetic field in the main gas chamber;
an ultrasonic transmitter and receiver sensor arranged on either the first or second end of the main elongate gas chamber and being configured to direct an ultrasonic wave along a longitudinal axis of the main elongate gas chamber, an opposite end of the main elongate gas chamber being reflective for an ultrasonic wave, or an ultrasonic transmitter sensor arranged on a first end of the main elongate gas chamber and an ultrasonic receiver sensor arranged on a second end of the main elongate gas chamber; and
a control unit configured to control the ultrasonic transmitter and receiver sensor and to determine a time of flight of the ultrasonic wave between transmitting and receiving the ultrasonic wave,
wherein the reference elongate gas chamber is arranged outside the magnetic field generated by the magnetic field device.

2. The gas sensor according to claim 1, wherein the magnetic field device comprises an electrical coil arranged coaxially with and in the main elongate gas chamber.

3. The gas sensor according to claim 1, wherein the control unit is configured to control the magnetic field device.

4. The gas sensor according to claim 1, further comprising:
a second ultrasonic transmitter and receiver sensor arranged on either a first or second end of the reference elongate gas chamber, an opposite end of the reference elongate gas chamber being reflective for an ultrasonic wave, or a second ultrasonic transmitter sensor arranged on the first end of the main elongate gas chamber and a second ultrasonic receiver sensor arranged on the second end of the main elongate gas chamber, wherein the second ultrasonic transmitter and receiver sensor is controlled by the controller to provide a reference signal.

5. The gas sensor according to claim 1, wherein the gas sensor comprises an oxygen sensor.

\* \* \* \* \*